UNITED STATES PATENT OFFICE.

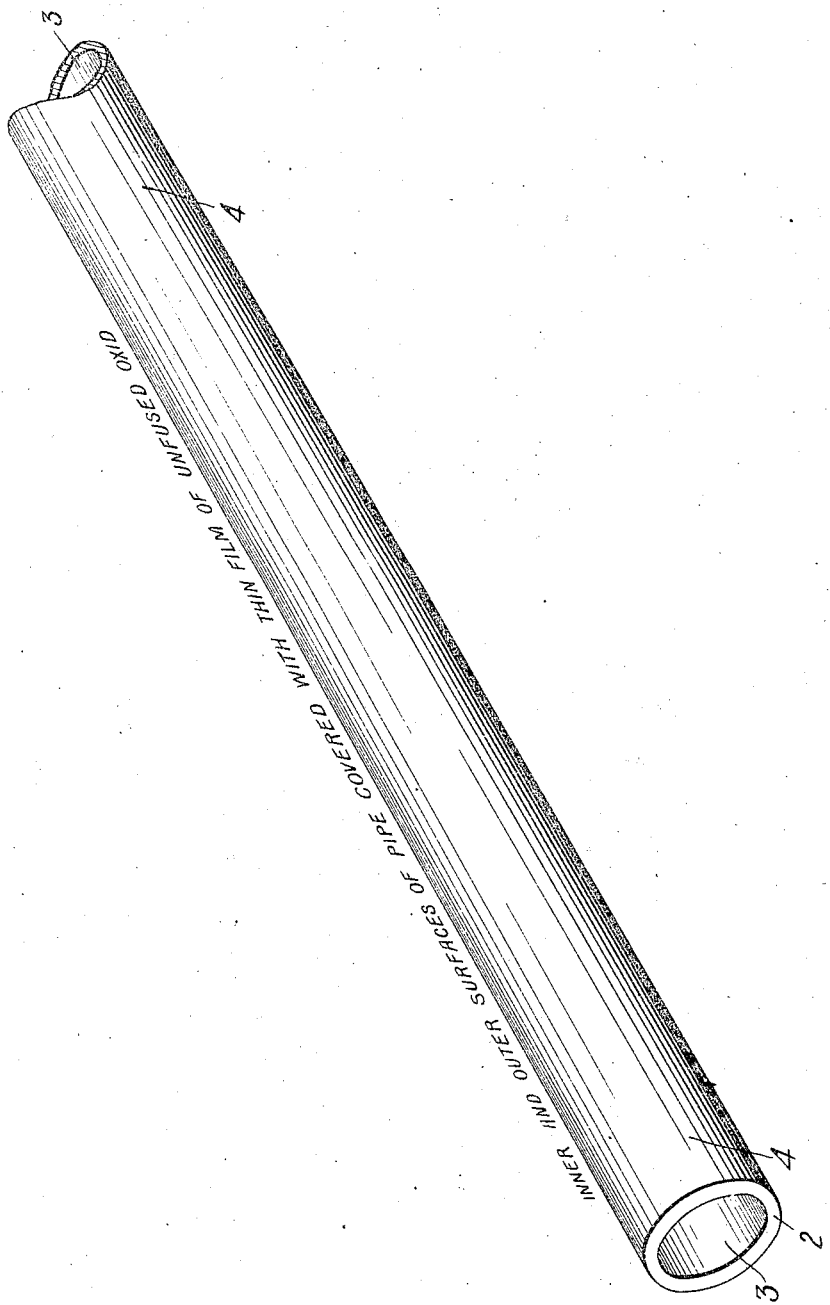

FRANK N. SPELLER, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

WELDED PIPE.

1,149,696.  Specification of Letters Patent.  Patented Aug. 10, 1915.

Application filed January 4, 1915. Serial No. 507.

*To all whom it may concern:*

Be it known that I, FRANK N. SPELLER, a citizen of the United States, and resident of Pittsburgh, in the county of Allegheny and State of Pennsylvania, have invented certain new and useful Improvements in Welded Pipes, of which the following is a specification.

My invention relates to welded pipes of the smaller sizes made of steel and generally by the buttweld process. The general practice is to employ the buttweld process in making pipes up to 3 inches in diameter and the lapweld process for making pipes from 2 inches up to the largest size, so that pipes of 2 to 3 inches diameter are made by both buttwelding and by lapwelding.

In the manufacture of welded pipe the skelp are heated in a welding furnace until at a welding temperature, this temperature being indicated by the scale melting and flowing freely on the surface of the metal, and as the heated skelp reach a welding temperature they are withdrawn successively from the furnace and passed between the welding rolls or through a welding bell.

In making lapweld pipe, the pipe balls which form an internal support for the skelp and the surfaces of the rolls, remove the major portion of the adhering scale from the inner and outer surfaces of the pipes.

The skelp in the buttwelding operation are bent into circular form and the longitudinal edges forcibly pressed together and thereby welded in passing through the welding bell. Usually the weld or seam is on the bottom of the pipe or bent skelp as the pipe passes through the welding bell in the welding operation.

The surfaces of the pipe skelp become covered with a coating of fluid cinder or scale in being heated to a welding temperature in the welding furnace, this cinder acting as a flux for the welding operation. Owing to its fluidity the cinder or liquor runs or flows on the surface of the skelp and in making buttweld pipe, in which process an internal support is not employed, the cinder or scale is fused on and adheres very tightly to the surfaces of the metal. This scale varies considerably in thickness, the thickest portion being along what is the bottom of the pipe while being drawn through the welding bell, and the scale being fused on the steel adheres tightly like enamel to the surfaces of the steel and is frequently of sufficient thickness on the inner surface of the pipe to materially lessen the internal diameter of the smaller sizes of pipes. The enamel-like quality of the scale on the interior of the pipe is further increased by the fusible silicates which are taken up by the skelp in being pulled over the hearth of the welding furnace.

With pipes which are afterward to be galvanized or enameled or otherwise coated it is essential that the adhering coating of scale be entirely removed. The scale, being electronegative to iron, accelerates corrosion and promotes pitting of the metal, so that it is very desirable that the scale should be removed for this reason also.

The removal of the scale is ordinarily accomplished by pickling the pipes in a solution of acid, but as the cinder or scale on the exterior surface of the buttweld pipes is very largely removed in passing through the welding bell, that on the inner surface will be much heavier. It is found that in pickling the pipes the outer surface will be freed of scale long before the inner surface. The difficulty of cleaning the interior surface of the pipe is further increased by the action of the acid pickling solution which tends to become stagnant within the pipes, where there is less circulation than around the outer surface.

Should the pipe be immersed in the pickling solution until the heavy scale on the inside is loosened and entirely removed, the exterior surface will be over-pickled, or as is known in the art, "burned." This leaves the surface of the pipes in a condition which prevents the spelter or other coating from properly adhering to the pipes, and in order to avoid over-pickling the outer surface of the pipes, resort is often made to the use of a sand blast or similar operation in order to remove the residue of scale from the inner surface of the pipes in preparing them for galvanizing or coating with damage to the outer surface by reason of prolonged pickling. The ideal condition of the surfaces of the pipes is to have the surfaces uniformly coated with a thin film of unfused oxid, the coating on the inner surface preferably being of less thickness than that on the outer surfaces. Such condition is exactly the reverse of the fused scale conditions as to thickness found in buttweld pipes as made heretofore.

The object of my invention is to provide a welded steel pipe having surfaces which are free from the fused scale formed in heating the pipe skelp for welding, and which has its surfaces covered with a thin covering or film of oxid which is not fused, and which is formed on the pipes by oxidation after the welding operation and after the fused scale present on the pipe at the completion of the welding operation has been removed.

The drawing is a perspective view of a buttweld pipe having a body or annular wall 2 with an inner surface 3 and an outer surface 4 from which the fused scale has been removed and which surfaces are covered with a thin film of unfused oxid.

My invention consists in a pipe from which all of the fused scale formed in heating the pipe skelp is removed from the welded pipes while the pipes are still heated from the welding operation and are at a temperature sufficiently high to cause the clean surfaces of the pipes to become oxidized by exposure to the action of the atmosphere, in being cooled after the completion of the welding and scale removing operations.

In making buttweld pipe the skelp are heated, during which operation they unavoidably acquire a thick coating of scale and after being heated to a welding temperature the skelp are welded in the usual known manner. The welded pipes are then subjected to the action of a series of rolls arranged in pairs to form roll passes and constructed in a manner which will alter and restore the cross section of the welded pipe or which substantially elongates the welded pipe when the welded pipe is still heated, but is cooled to a temperature below that at which the scale sets and becomes brittle. This temperature is about 850 degrees to 1100 degrees centigrade.

By timing the delivery of the pipes to the rolls after the welding operation so as to permit the pipes to cool sufficiently for the fused scale to have become set on the interior of the pipes, (the interior of the pipes remaining hot for a longer time than the outer surface which is exposed to the atmosphere) and by then changing or distorting the cross section of the pipes sufficiently in passing the pipes in the roll passes, the brittle scale will crack off the surfaces of the pipes and leave the surfaces 3 and 4 clean and free from any adhering scale.

The temperature of the pipes 2 will still be high enough after they emerge from the last pass of the rolls to enable the atmosphere to oxidize the surfaces of the pipes and form a film of unfused oxid on the surfaces, in this way providing pipes having an oxidized surface which is readily distinguished from pipes made by the methods known heretofore, by differences in thickness, color and uniformity. Pipes made in this manner are then readily pickled to provide the metallic surface necessary and desirable in later galvanizing, enameling or other coating operations.

The advantages of my invention will be apparent to those skilled in the art. By treating the pipes by the method which has been described, an improved article of manufacture is provided and welded pipes are formed having scale free surfaces which are covered with a coating of unfused oxid, the unfused oxid covering enabling the pipes to be readily distinguished from pipes having the usual scale covered surfaces.

The means employed in removing the scale from the surfaces of the pipes may be varied, the only requisite being that the pipe be changed in cross section after welding sufficiently to insure the fused scale formed in heating the pipe skelp being removed while the pipe remains at a temperature high enough to cause oxidation of its surfaces after the removal of the scale.

I claim:—

1. A steel buttweld pipe having scale free surfaces covered with a thin coating or film of unfused oxid formed thereon after the welding operation.

2. A steel buttweld pipe having an inner scale free surface covered with a thin coating or film of unfused oxid formed thereon after the welding operation.

In testimony whereof, I have hereunto set my hand.

FRANK N. SPELLER.

Witnesses:
IVAN B. McCORKLE,
HOWARD G. TEXTER.